United States Patent
Kupcsik et al.

(10) Patent No.: US 12,304,087 B2
(45) Date of Patent: May 20, 2025

(54) METHOD AND DEVICE FOR OPERATING A MACHINE

(71) Applicant: Robert Bosch GmbH, Stuttgart (DE)

(72) Inventors: Andras Gabor Kupcsik, Boeblingen (DE); Leonel Rozo, Boeblingen (DE); Meng Guo, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1002 days.

(21) Appl. No.: 17/355,961

(22) Filed: Jun. 23, 2021

(65) Prior Publication Data

US 2021/0402606 A1 Dec. 30, 2021

(30) Foreign Application Priority Data

Jun. 30, 2020 (DE) .................. 102020208169.7

(51) Int. Cl.
*B25J 9/16* (2006.01)
*G05B 13/04* (2006.01)
*G06F 9/448* (2018.01)

(52) U.S. Cl.
CPC .......... *B25J 9/1671* (2013.01); *B25J 9/1661* (2013.01); *B25J 9/1664* (2013.01); *G05B 13/042* (2013.01); *G06F 9/4498* (2018.02)

(58) Field of Classification Search
CPC ...... B25J 9/1671; B25J 9/1661; B25J 9/1664; B25J 9/0081; G05B 13/042; G05B 19/423; G05B 2219/36416; G05B 2219/39205; G05B 2219/40391; G06F 9/4498; G06N 20/00; G10L 15/14; G10L 15/142; G10L 15/144
See application file for complete search history.

(56) References Cited

U.S. PATENT DOCUMENTS

| 6,591,146 B1* | 7/2003 | Pavlovic | ................. G06N 20/00 700/47 |
| 2017/0068897 A1* | 3/2017 | Wasserkrug | ............. G06N 7/01 |

(Continued)

FOREIGN PATENT DOCUMENTS

| DE | 102019216229 A1 | 4/2021 | |
| DE | 102019216560 A1 | 4/2021 | |
| WO | WO-2018143607 A1 * | 8/2018 | ............ B25J 9/0081 |

OTHER PUBLICATIONS

Yang, J., Xu, Y. and Chen, C.S., 1994. Hidden Markov model approach to skill learning and its application to telerobotics. IEEE transactions on robotics and automation, 10(5), pp. 621-631. (Year: 1994).*

(Continued)

*Primary Examiner* — Alicia M. Choi
(74) *Attorney, Agent, or Firm* — NORTON ROSE FULBRIGHT US LLP

(57) ABSTRACT

A device for and method of operating a machine. The method includes providing a sequence of skills of the machine for executing a task, selecting a sequence of states from a plurality of sequences of states, depending on a likelihood, wherein the likelihood is determined depending on a transition probability from a final state of a first sub-sequence of states of the sequence of states for a first skill in the sequence of skills to an initial state of a second sub-sequence of states of the sequence of states for a second skill in the sequence of skills.

9 Claims, 3 Drawing Sheets

(56) References Cited

U.S. PATENT DOCUMENTS

| | | | | |
|---|---|---|---|---|
| 2020/0070343 | A1* | 3/2020 | Thomaz | B25J 9/163 |
| 2021/0362331 | A1* | 11/2021 | Kolluri | G06F 9/4498 |
| 2021/0390352 | A1* | 12/2021 | Rosman | G06F 18/2193 |
| 2022/0036179 | A1* | 2/2022 | Garg | G06N 3/08 |
| 2023/0081738 | A1* | 3/2023 | Straehle | B25J 9/1664 |
| | | | | 700/245 |

OTHER PUBLICATIONS

Wang, H., Fan, S., Song, J., Gao, Y. and Chen, X., 2014. Reinforcement learning transfer based on subgoal discovery and subtask similarity. IEEE/CAA Journal of Automatica Sinica, 1(3), pp. 257-266. (Year: 2014).*

Tanwani, A.K. and Calinon, S., 2016. Learning robot manipulation tasks with task-parameterized semitied hidden semi-Markov model. IEEE Robotics and Automation Letters, 1(1), pp. 235-242. (Year: 2016).*

Hershey et al., "Approximating the Kullback Leibler Divergence Between Gaussian Mixture Models," International Conference on Acoustics, Speech and Signal Processing (ICASSP), IEEE, vol. 4, 2007, pp. 1-5.

Schwenkel, et al.: "Optiizing Sequences of Probalilistic Manipulation Skills Learned from Demonstration", 3rd Conference on Robot Learning (CoRL 2019), pp. 273-282, http://proceedings.mlr.press/v100/schwenkel2 0a.html [accessed on May 6, 2021].

Havoutis and Calinon: "Supervisory teleoperation with online learning and optimal control", 2017 IEEE International Conference on Robotics and Automation (ICRA), Jun. 2017, pp. 1534-1540; https://ieeexplore.ieee.org/stamp/stamp.jps?tp=&arnumber=7989183 [accessed on May 6, 2021].

Xi, et al.: "A robotic shared control teleoperation method based on learning from demonstrations", International Journal of Advanced Robotic Systems, (2019), pp. 1-13. https://journals.sagepub.com/doipdf/10.1177/1 729881419857428 [accessed on May 6, 2021].

* cited by examiner

METHOD AND DEVICE FOR OPERATING A MACHINE

CROSS REFERENCE

The present application claims the benefit under 35 U.S.C. § 119 of German Patent Application No. DE 102020208169.7 filed on Jun. 30, 2020, which is expressly incorporated herein by reference in its entirety.

BACKGROUND INFORMATION

It is desirable to solve complex assembly tasks using robotic automation with robot skills that were manually shown to the robot via kinesthetic teaching.

SUMMARY

This may be achieved by a method of and device for operating a machine according to example embodiments of the present invention.

In accordance with an example embodiment of the present invention, the method of operating the machine comprises providing a sequence of skills of the machine for executing a task, selecting a sequence of states from a plurality of sequences of states, depending on a likelihood, wherein the likelihood is determined depending on a transition probability from a final state of a first sub-sequence of states of the sequence of states for a first skill in the sequence of skills to an initial state of a second sub-sequence of states of the sequence of states for a second skill in the sequence of skills. An optimal state sequence is found this way based on a desired goal of the task and an initial state of the machine or environment.

In accordance with an example embodiment of the present invention, the method may comprise providing a first model for the first skill, wherein a parameter of the first model defines a trajectory in a state of the first sub-sequence of states or by providing a first model for the second skill, wherein a parameter of the first model defines a trajectory in a state of the second sub-sequence of states, the method further comprising determining for the state of the sequence of states the parameter, and determining a control signal for operating the machine according to the trajectory depending on the parameter. The trajectory is a reference for an optimal control of the machine.

In accordance with an example embodiment of the present invention, the method may comprise providing a second model comprising the plurality of sequences of states, determining the likelihood for at least one sequence of the plurality of sequences depending on the transition probabilities between the sub-sequences of states for the skills in the at least one sequence, selecting the sequence of states from the second model having a higher likelihood compared to at least one other sequence of states of the plurality of sequences of states. The second model comprises cascades of first models that are composed for determining the optimal sequence of states using a Viterbi algorithm.

In accordance with an example embodiment of the present invention, the method may comprise mapping a first observation for the machine to the first state, wherein the sequence of states starts at the first state and/or mapping a second observation to the second state wherein the sequence of states ends at the second state. This allows to determine the entire optimal sequence of states from two observations.

The first observation may characterize the machine or the environment of the machine before executing a first skill in the sequence of skills and/or wherein the second observation may characterize the machine or the environment of the machine after executing a last skill in the sequence of skills. This enables a simplified Viterbi algorithm based only on the initial and final observation in the task.

Providing the second model may comprise determining the transition probability from the final state of the first sub-sequence according to the first skill to a plurality of initial states of different second sub-sequences according to different instances of the second skill. This cascades different sub-sequences for the second skill with one sub-sequence of first skill.

The final state of the first sub-sequence may be determined depending on a final component of an instance of the first skill. The instance of the first skill may be a TP-HSMMs having multiple final components, i.e. different first sub-sequences. The final component defines the final state of one first sub-sequence and is hence linkable to the initial component of the initial state of the second sub-sequence.

At least one initial state of the second sub-sequence may be determined depending on an initial component of an instance of the second skill.

The transition probability may be determined depending on a divergence between a first Gaussian Mixture Model for the final component and a second Gaussian Mixture Model for the initial component.

The instance of the first skill and/or the instance of the second skill may be defined by a task-parameterized hidden semi Markov model.

In accordance with an example embodiment of the present invention, a device for operating a machine is adapted to perform the steps of the example methods.

Further advantageous embodiments of the present invention can be derived from the following description and the figures.

DETAILED DESCRIPTION OF EXAMPLE EMBODIMENTS

Figure 1:
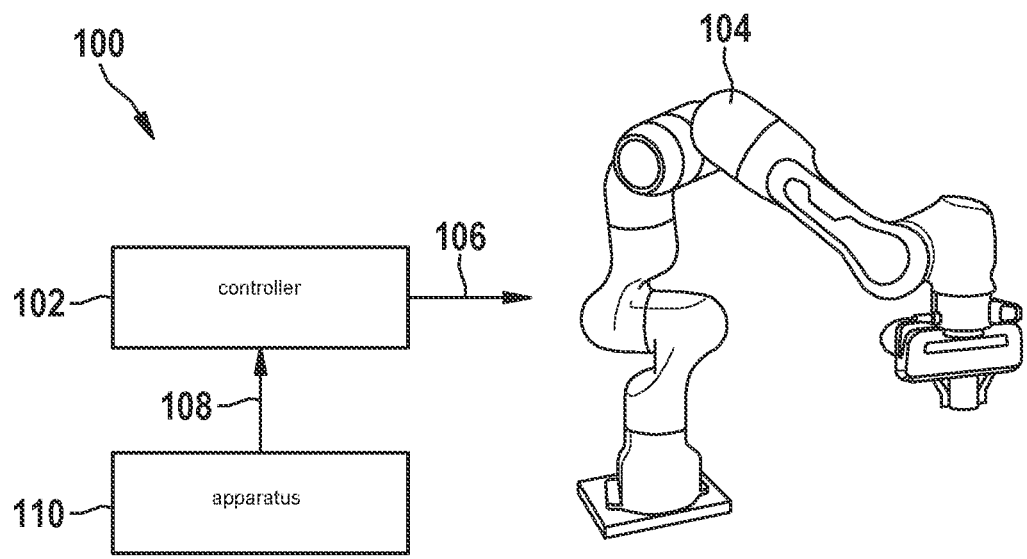
FIG. 1 depicts a part of a control system, in accordance with an example embodiment of the present invention.

FIG. 1 depicts a part of a control system 100 comprising a controller 102 for controlling a machine 104. The controller 102 is adapted to output control signal 106 for controlling the machine 104.

The machine 104 may be a robot. The controller 102 may be adapted to control the machine 104 depending on information about a state of the machine 104 or its environment. The environment may include at least one object that is manipulatable by the machine 104. The machine 104 and/or its environment is referred to as system herein.

One approach to solving complex assembly tasks is robotic automation with robot skills that were manually shown to the robot via kinesthetic teaching. Kinesthetic teaching is easy to perform by any worker who is familiar with an assembly process. Several demonstrations are collected for each unique robot skill, e.g., inserting a peg in a hole.

To capture the stochasticity of human demonstrations, the shown skills are encoded in statistical models, such as, Task-Parametrized Hidden Semi-Markov Models, TP-HSMMs.

According to the following description, a particular skill is encoded in a first model and sequencing is performed with different first models of different skills to determine a second model.

In the context of the description, model state refers to a Gaussian distribution of the TP-HSMM. System state refers to a robot state, for example, a position-orientation of its end-effector, or position and velocity of its end-effector. Observation refers to data used to train a skill, i.e. to train a TP-HSMM, or to reproduce a skill using a Viterbi Algorithm with an initial observation for the start of the skill and a target or goal observation for the end of the skill. These observations can correspond to the system state, or comprise it. Observations can include some additional variables that are specific for the problem.

The approach in accordance with an example embodiment of the present invention uses cascading of multiple first models, e.g., model states encoded in TP-HSMMs, together to build a larger second model corresponding to a multi-stage assembly procedure. For example, for a case of a first model for pick skill and a first model for a place skill, the second model for a pick-and-place skill is created that corresponds to a single TP-HSMM. The first model for a particular skill may encode multi-modal trajectory distributions for this particular skill to ensure generality and flexibility. For example, a pick skill may perform an object picking approach from a side, a top, a bottom of an object.

According to this approach, an amount of possible trajectory distribution modes are encoded in the cascaded, i.e., sequenced, second model. The number of possible trajectory distributions grows exponentially with a number of skills in the cascade.

According to this approach, it is determined which trajectory distribution mode the machine 104 should follow to fulfil a goal of the task. A framework will be described below that is able to find the most likely skill sequence instantiation that fulfils the goal.

According to an example, a cascaded model for pick-and-place is provided. Given the goal as a goal location for placing an object, a forward pass and a backward pass of the second model finds a state sequence that most likely fulfils the goal compared to other state sequences that can be found according to the second model.

In an example an orientation of an end-effector state of a robot is encoded and represented as unit quaternion. The quaternion belongs to a $S^3$ hypersphere, which can be described as a Riemannian manifold.

In the example, the state is defined in a Riemannian manifold $\mathcal{M}_R = \mathbb{R}^3 \times S^3 \times \mathbb{R}^1$. The modeling technique TP-HSMM is adapted to handle variables in Riemannian manifolds.

The controller 102 may be for linear quadratic tracking to solve a control problem, e.g. retrieve an optimal trajectory for a state sequence depending on information 108 about the state sequence. The controller 102 may be adapted according to a scalable finite-horizon linear quadratic tracking control algorithm for Riemannian manifolds.

The controller 102 may be an optimal Riemannian controller: in optimal linear quadratic tracking the dynamics is defined to be linear in states and actions. The cost function to minimize is quadratic in states and actions. Given the initial state of the system the complete state sequence is defined as a function of control actions at each time step. Furthermore, states and control actions can be concatenated at every time step into two large column vectors, and their dynamics relationship into a large quadratic matrix. A quadratic cost is defined as a linear function of the control actions. Finally, the optimal control actions can be obtained by a matrix inversion.

However, as matrix inversion scales cubically with the size of the matrix. The size is in the exemplary case the number of time steps times the dimensionality of the states. This solution is derived purely from linear algebraic steps and allows to compute the optimal control and state sequence in one batch.

Instead of solving the control problem in a batch form, the controller 102 may be implemented as an optimal feedforward and feedback controller recursively solving the control problem. The Bellman equation may be used as described below to solve the control problem using a cost-to-go function. Accordingly, an optimal action in a state decreases its cost-to-go function in the steepest direction. By exploiting this property of the cost-to-go function the optimal control actions are found recursively. In this example, the recursive formulation described below is used for Riemannian manifolds. This solution is less expensive to compute.

In one aspect the controller 102 is adapted to control the machine 104 according to a reference trajectory corresponding to a state sequence provided depending on the cost-to-go function. The Viterbi algorithm may be used to determine the state sequence.

The optimal control solution is defined depending on the description of the system A, B for example as:

$$P_t = \tilde{\Sigma}_{k_t}^{-1} + A^T \tilde{P}_{t+1}(I - Q_t \tilde{P}_{t+1})A$$

where $$Q_t = B(R + B^T \tilde{P}_{t+1} B)^{-1} B^T$$

$$\tilde{P}_{t+1} = A_{\|\mu_{k_{t+1}}^{\mu_{k_t}}} \tilde{P}_{t+1} A_{\|\mu_{k_{t+1}}^{\mu_{k_t}}}^T \quad \text{and}$$

$$d_t = (A^T - A^T \tilde{P}_{t+1} Q_t) \times \left(\tilde{d}_{t+1} + 2\tilde{P}_{t+1}\left(\text{Log}_{\mu_{k_t}}\left(\text{Log}_{\mu_{k_{t+1}}}\right) - A\text{Log}_{\mu_{k_t}}(\hat{\mu}_{k_t})\right)\right)$$

wherein $$\tilde{d}_{t+1} = A_{\|\mu_{k_{t+1}}^{\mu_{k_t}}} + d_{t+1}$$

$$u_t = (R + B^T \tilde{P}_{t+1} B)^{-1} B^T \times \left(\tilde{P}_{t+1} \text{Log}_{x_t}(\hat{\mu}_{k_{t+1}}) - A\text{Log}_{x_t}(x_t) + \frac{1}{2}\tilde{d}_{t+1}\right)$$

wherein $$\check{P}_{t+1} = A_{\|\mu_{k_{t+1}}^{x_t}} \tilde{P}_{t+1} A_{\|\mu_{k_{t+1}}^{x_t}}^T \quad \text{wherein}$$

$$\check{d}_{t+1} = A_{\|\mu_{k_{t+1}}^{x_t}} d_{t+1}$$

and wherein $$A_{\|\mu_{k_{t+1}}^{x_t}}$$

defines a parallel transport operation between $x_t$ and $\hat{\mu}_{k_{t+1}}$ and wherein R defines parameters of the control.

For the optimal control solution, the properties of A and B are basically dictated, generally speaking, by the system dynamics model. The R matrix is usually manually designed.

The information 108 may be provided to the controller 102 by an apparatus 110 for planning states for the operation of the machine 104.

Figure 2:
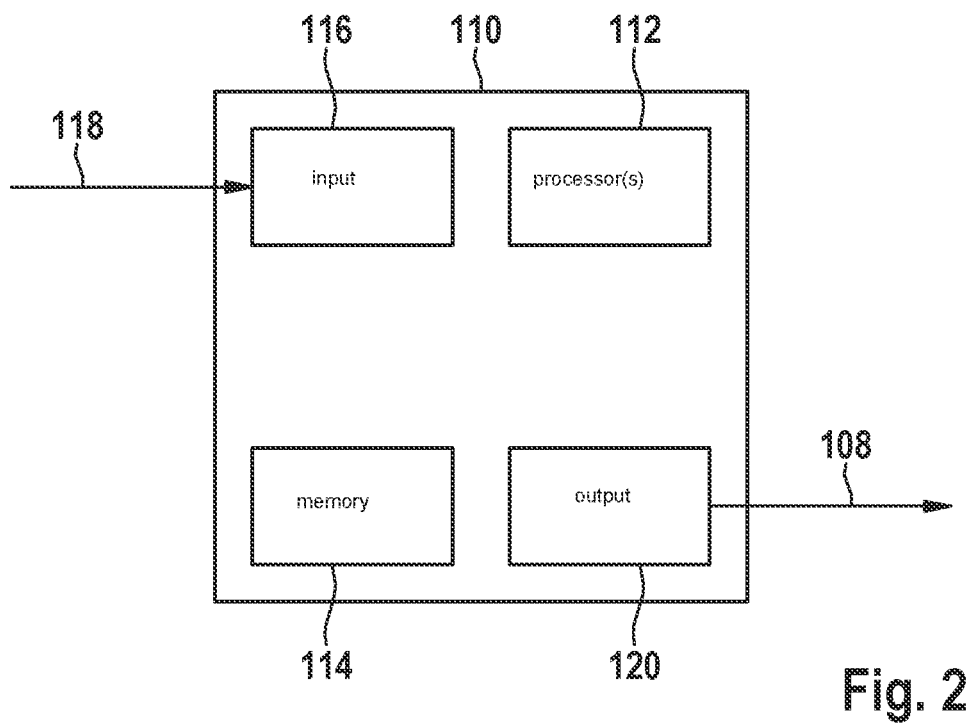
FIG. 2 depicts parts of an apparatus, in accordance with an example embodiment of the present invention.

FIG. 2 depicts a part of the apparatus 110. The apparatus 110 comprises at least one processor 112 and at least one memory 114. The apparatus 110 in the example comprises at least one input 116 for at least one observation 118. The observation 118 may define the state. The apparatus 110 in the example comprises at least one output 120 for the information 108 about the state sequence. The apparatus 110 may comprise a user interface (not depicted). The user interface may be adapted to detect a task to be executed by the machine 104 from user input.

The apparatus 110 and the controller 102 are adapted to execute steps in the method described below for controlling the machine 104. The at least on processor 112 may be adapted to execute instructions stored in the at least one memory 114 to perform steps of the method to determine the information 108 for the at least one output 120 from at least one observation 118 received at the at least one input 116.

An observation 118 may be defined by a data point defining a state of the system. In a training, a plurality of observations 118 for performing a skill may be captured by at least one sensor from a human demonstration. Preferably, a spatial-temporal sequence of observations is captured while the human demonstrates the skill.

In the example the machine 104 is adapted to perform a plurality of different skills.

Figure 3:
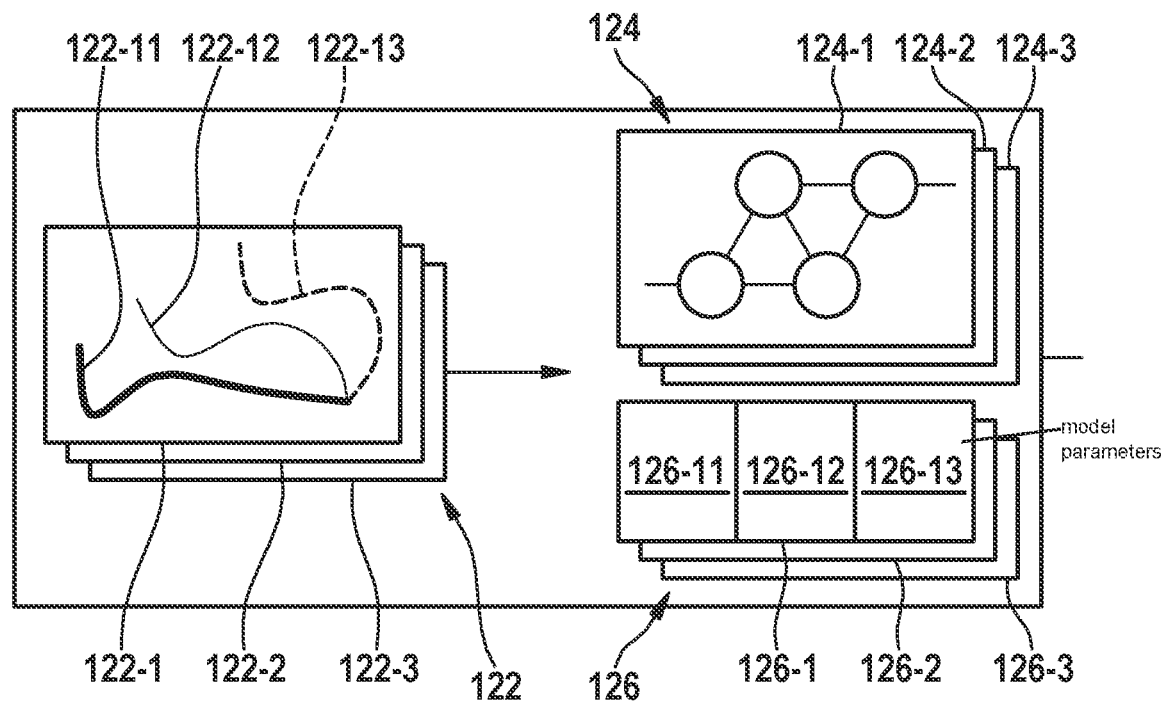
FIG. 3 depicts aspects of first models for an operation of a machine, in accordance with an example embodiment of the present invention.

A set of demonstrations 122 may be recorded for the plurality of different skills. FIG. 3 exemplary depicts three demonstrations 122-1, 122-2, 122-3 for three different skills. FIG. 3 exemplary depicts three spatial-temporal sequences of observations 122-11, 122-12, 122-13 for the same demonstration 122-1. In one example, the machine 104 is a robot adapted to pick, place or move an object in a workspace of the robot. The machine 104 may be adapted to perform the same skill on a plurality of different objects or on the same object at a plurality of different positions in the workspace. The procedure described herein may apply to any other skill of the robot or the machine 104 and to any other object.

Spatial coordinates of one spatial-temporal sequence of observations are in the example defined relative to a coordinate system having an origin assigned to one object. The spatial-temporal sequence for exercising a specific skill with a specific object may be recorded from a perspective of specific coordinate system and transformed to a frame. In the example, the set of demonstrations 122 comprises a plurality of spatial-temporal sequences of observations recorded from a plurality of human demonstration from different perspectives that are transformed in frames that are assigned to different objects. The demonstration in the example is a human demonstration. The demonstration may be a demonstration by a training device as well.

The apparatus 110 is adapted to determine a plurality of first models 124 depending on the set of demonstrations 122. In FIG. 3 a model 124-1 defined by a first demonstration 122-1 of a first skill, a model 124-2 defined by a second demonstration 122-2 of a second skill and a model 124-3 defined by a third demonstration 122-3 of a third skill are depicted. In the example the model 124-1 is a task-parameterized hidden semi Markov model, TP-HSMM, the model 124-2 is a TP-HSMM and the model 124-3 is a TP-HSMM.

The apparatus 110 may be adapted to determine a TP-HSMM depending on a number of Gaussian components of a Gaussian Mixture Model, GMM.

The apparatus 110 is adapted to determine at least one task parameter 126-1 for the model 124-1, at least one task parameter 126-2 for the model 124-2 and at least one task parameter 126-3 for the model 124-3. The at least one task parameter 126-1 may comprise model parameters 126-11 for a state before executing the first skill (precondition model) and model parameters 126-12 for a prediction of a state after executing the first skill (predicted-final-state model). The apparatus 110 is adapted to determine these parameters depending on at least one frame determined by at least one observation for the first state of the system before executing the first skill. The at least one state parameter 126-1 may comprise further model parameters 126-13 for the state after executing the first skill (final-condition model). These may be implemented as GMMs. The apparatus 110 may be adapted to determine the further model parameters 126-13 depending on at least one frame determined by at least one observation for the state the system after executing the first skill. The apparatus 110 is in the example adapted to determine these model parameters for the model 124-2 and 124-3 as well.

Figure 4:
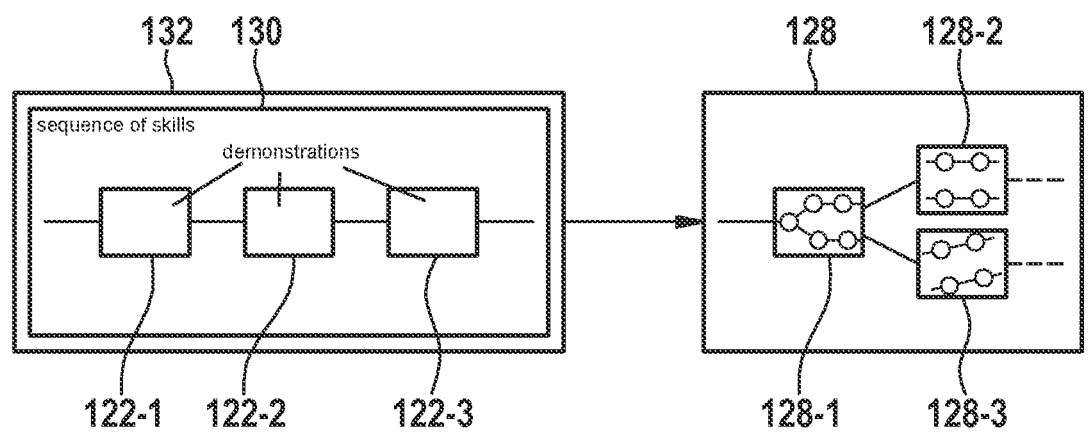
FIG. 4 depicts aspects of a second model for the operation of the machine, in accordance with an example embodiment of the present invention.

FIG. 4 depicts aspects of a second model 128 for the operation of the machine 104. The second model is used in the example for determining the state sequence for operation of the machine 104.

The apparatus 110 is adapted to determine the second model 128 depending on a sequence of skills 130 for performing a task 132. The task 132 may comprise manipulating an object with the machine 104. The task 132 is in the example provided by a user of the machine 104 by user input via the user interface.

For the exemplary task 132, the first skill 122-1, the second skill 122-2 and the third skill 122-3 may be executed in this order for performing the task 132. The apparatus 110 is in this case adapted to map the task 132 to this order of the three skills.

In the example, the apparatus 110 is adapted to determine a cascade of an instance 128-1 of the model 124-1 with a first instance 128-2 for the model 124-2 and a second instance 128-3 for the model 124-2.

The apparatus 110 is adapted to update the second model 128 according to the instance 128-1 of the model 126-1 and the first instance 128-2 of the model 126-2. The apparatus 110 is adapted to update the second model 128 according to the instance 128-1 of the model 126-1 and the second instance 128-3 of the model 124-3. More specifically, the second model 128 may be updated according to a first cascade comprising the instance 128-1 and the first instance 128-2 and according to a second cascade comprising the instance 128-1 and the second instance 128-2.

The second model 128 comprises in the example at least one sequence according to the first cascade and at least one sequence according to the second cascade The first cascade comprises in the example different instances of the model 124-3 for a plurality of components of the model 124-2 and the second cascade comprises in the example different instances of the model 124-3 for a plurality of components of the model 124-2.

This means that for different components, the same sequence of skills may result in a plurality of different cascades. The second model 128 comprises a plurality of sequences of states.

The apparatus 110 is adapted to determine an optimal sequence of states ŝ* for the control of the machine 104 depending on a sequence of model states in the second model 128. The apparatus 110 in one aspect is adapted to apply a Viterbi algorithm to determine which sequence of model states in the second model 128 to choose as the optimal sequence of states ŝ*.

A method to determine the optimal sequence of states ŝ* is described below. A sequence of model states from the model 128 is considered optimal for example when it has assigned to it a highest likelihood of all likelihoods assigned to the available sequences of model states in the second model 128. It may be sufficient for the sequence of model states to have a higher likelihood than another sequence of model states for it to be useful. Hence the idea is not limited to the optimal sequence of states ŝ*.

The input to the method is a sequence of skills a*, an initial state $x_0$, a target or goal state $x_G$, a plurality of first models $\Theta_a$ for the skills a in the sequence of skills a* and their respective model parameters $\Gamma_a$.

The method comprises computing the second model 128, referred to as $\hat{\Theta}_{a*}$ below, depending on the sequence a* of skills $a_1, a_2, \ldots$ by cascading TP_HSMMs for the skills $a_1, a_2, \ldots$, in their subsequent order in the sequence a* starting with a first skill $a_1$ and ending with a last skill of the sequence.

The example below describes the cascade of a TP-HSMM for the first skill $\Theta_{a_1}$ and a TP-HSMM for the second skill $\Theta_{a_2}$. Composed model parameters $\hat{\Gamma}$ may be determined from the GMMs associated with the first skill $\Gamma_{a_1}$ and the second skill $\Gamma_{a_2}$ as described below. Other pairs of skills may be processed alike, e.g. $a_2, a_3$ or $a_3, a_4$.

The second model $\hat{\Theta}_{a*}$ may include all possible cascades.

The TP-HSMM for the first skill $\Theta_{a_1}$ and the TP-HSMM for the second skill $\Theta_{a_2}$ comprises:

a) for all final components $k_f \in \Theta_{a_1}$ do:
  i) create a copy:

$$\Theta_{a_2}^{k_f} \triangleq \Theta_{a_2}$$

ii) compute the transition probability from one final component $a_{k_f}$ of the TP-HSMM for the first skill $\Theta_{a_1}$ for the first skill $a_1$ for all initial components $k_i \in \Theta_{a_2}^{k_f}$ of the TP-HSMM for the second skill $a_2$ by:

$$a_{k_f, k_i} \propto \exp\left(-\sum_{p \in P_c} KL\left(\Gamma_{T,a_1}^{(p)}(k_f) \| \Gamma_{1,a_2}^{(p)}(k_i)\right)\right)$$

where KL is a Kullback-Leibler divergence as described in J. R. Hershey and P. A. Olsen, "Approximating the Kullback Leibler divergence between Gaussian mixture models," in Intl. Conf. on Acoustics, Speech and Signal Processing (ICASSP), vol. 4. IEEE, 2007, pp. IV-317; where $\Gamma_{T,a_1}^{(p)}(k_f)$ is the GMM associated with component $k_f$ for frame p, where $\Gamma_{1,a_2}^{(p)}(k_i)$ is the GMM associated with component $k_i$ for frame p, where $P_c = \Gamma_{T,a_1} \cap P_{1,a_2}$ is the set of common frames shared by these two models, which can be forced to be nonempty by always adding the global frame.

iii) update the TP-HSMM for the second skill $\Theta_{a_2}^{k_f}$ and the GMM $\Gamma_{T,a_2}^{(k_f)}$ for the final component $k_f$ of the second skill $a_2$ by:

$$(\hat{\mu}_k^{(p)}, \hat{\Sigma}_k^{(p)}) \triangleq \mu_k^{(p)}, \Sigma_k^{(p)} \otimes b_{k_f}^{(p)} A_{k_f}^{(p)}$$

where $\otimes$ is defined as $$\hat{\Sigma}_k = \left[\sum_{p=1}^{P}(\hat{\Sigma}_k^{(p)})^{-1}\right]^{-1}, \hat{\mu}_k = \left[\sum_{p=1}^{P}(\hat{\Sigma}_k^{(p)})^{-1}\hat{\mu}_k^{(p)}\right]$$

where the parameters of the updated Gaussian at each frame p are computed as:

$$\hat{\mu}_k^{(p)} = A^{(p)}\mu_k^{(p)} + b^{(p)}$$

and $$\hat{\Sigma}_k^{(p)} = A^{(p)}\Sigma_k^{(p)}A^{(p)T}$$

iv) add a cascade of $\Sigma_{a_1}$ and $\Sigma_{a_2}^{k_f}$ to the second model $\hat{\Theta}_{a*}$
b) Optionally, set additional parameters of the second model $\hat{\Theta}_{a*}$
c) Optionally, the composed model parameters $\hat{\Gamma}$ for the model may be determined by $$\hat{\Gamma} = \{\hat{\Gamma}_1, \hat{\Gamma}_T, \hat{\Gamma}_{1T}\} = \{\Gamma_{1,a_1}, \Gamma_{T,a_2}, \Gamma_{1T,a_2}^{k_f}, \forall k_f\}$$

The method further comprises computing the optimal sequence of states, ŝ* below, by:

a) determining for all cascades of the second model $\hat{\Theta}_{a*}$ depending on a given initial observation $\xi_0$ and a given final observation $\xi_T$ for the task that the optimal sequence shall perform, for each skill a in the cascade a likelihood $$d_t(j) = \max_{d \in D} \max_{i \neq j} d_{t-d}(i) a_{ij} p_j(d) \prod_{t'=t-d+1}^{t} \tilde{b}_j(\xi_{t'}),$$

$$d_1(j) = b_j(\sigma_j)\pi_j p_j(1),$$

where $d_t(j)$ is the likelihood of being in model state j at step or time t and not being in model state j at step or time t+1 and $$\tilde{b}_j(\xi_{t'}) = \begin{cases} N(\xi_{t'} \mid \hat{\mu}_j, \hat{\Sigma}_j) & t = 1 \vee t = T \\ 1 & 1 < t < T \end{cases}$$

where $(\hat{\mu}_j, \hat{\Sigma}_j)$ is a global Gaussian component for the model state j in the model $\Theta_a$ for the skill a, and wherein model state j is a state of a sequence of model states in the second model Gaussian component.

In the example, the two arguments d and i that maximize the likelihood are recorded for the model state j in the cascade.

The Viterbi algorithm is used to compute the most-likely sequence of states using a transition matrix and emission probabilities. The transition matrix is used as input to the forward pass of the Viterbi algorithm. Given a skill represented by an HSMM, the initial observation and a final observation, the two equations above are used to compute the most-likely sequence of HSMM states. This sequence of HSMM states corresponds to the TP-GMM Gaussians. This sequence of state is given for each time step of a time horizon. The time horizon can specifically be given e.g. by an expert. That is, at each time step of the time horizon there is a single TP-HSMM assigned as the most likely one.

b) determine in the second model $\hat{\Theta}_{a*}$ the final model state j of the last skill in the sequence a* of skills $a_1, a_2, \ldots$ that has the highest likelihood.

c) determine a sequence of model states to the first state selecting preceding model states j of the final model state j of the last skill in the sequence a* of skills $a_1$, $a_2$, . . . that has the highest likelihood. In the example, the Viterbi algorithm is used to evaluate the likelihoods of a plurality of sequences of model states in the second model 128. In one aspect the likelihoods are evaluated as the observation probability from the initial state of the goal state via the model states in the cascaded model. The sequence of model states that has the highest likelihood is then chosen as the optimal sequence.

The method further comprises controlling the machine 104 for executing each skill $a_h$ of the sequence a* of skills $a_1$, $a_2$, . . . by
- a) Observing a current system state $x_{h,0}$
- b) Updating the parameters of the corresponding first model, i.e. the global Gaussian components $(\hat{\mu}_j, \hat{\Sigma}_j)$ for the model states j of a sub-sequence $\hat{s}_{h*}$ of the optimal sequence $\hat{s}*$ starting at the given current system state $x_{h,0}$. This means that the sub-sequence $\hat{s}_{h*}$ is the optimal sequence of model states for the skill $a_h$.
- c) Tracking the trajectory provided by the global Gaussian components $(\hat{\mu}_j, \hat{\Sigma}_j)$ for the model states j of the sequence $\hat{s}_{h*}$. This means, that the trajectory of the optimal sub-sequence $\hat{s}_{h*}$ for the skill $a_h$ is tracked until the final model state for the skill $a_h$.

Starting from the first skill $a_1$ the latter steps a) to c) may be repeated until the goal of the task is achieved, i.e. until the last model state of the last skill in the sequence of a* has been executed.

Figure 5:
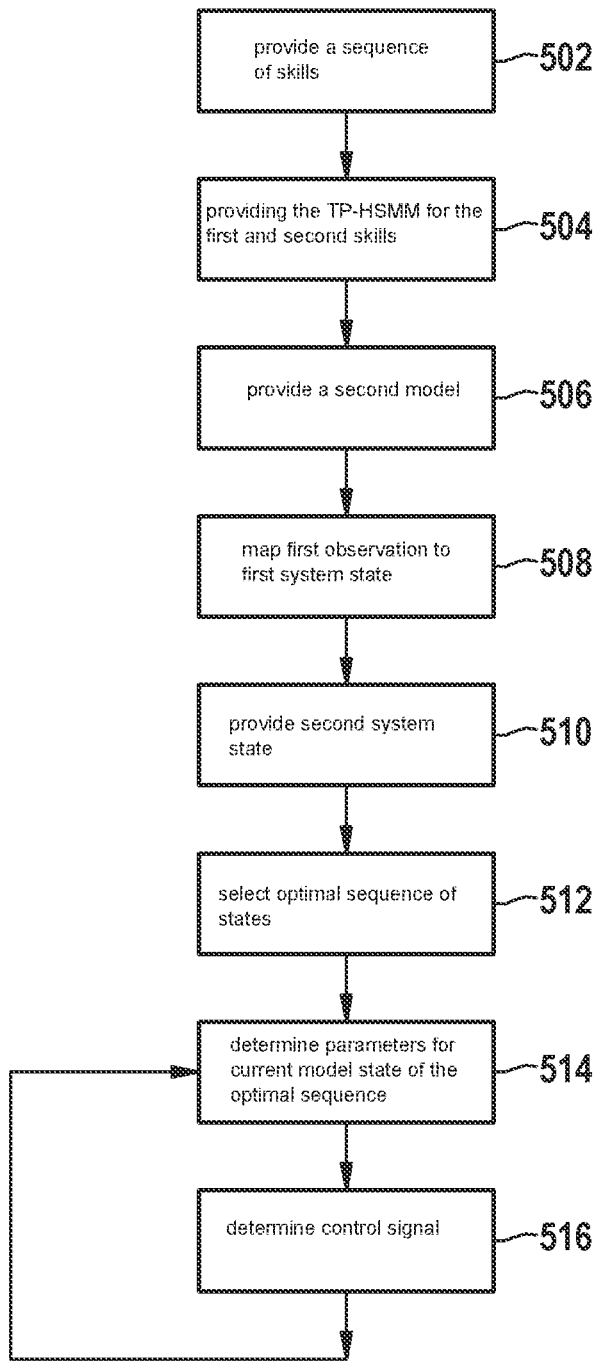
FIG. 5 depicts steps of a method, in accordance with an example embodiment of the present invention.

An exemplary method of operating the machine 104 in accordance with the present invention is described below with reference to FIG. 5. The sequence of model states may start at a given first system state $x_0$ and end at a given second system state $x_G$.

The method comprises a step 502.

In step 502 a sequence a* of skills 132 of the machine 104 is provided for executing a task Afterwards a step 504 is executed.

Step 504 may comprise providing the TP-HSMM for the first skill. Step 504 may comprise providing the TP-HSMM for the second skill.

The parameters $(\hat{\mu}_j, \hat{\Sigma}_j)$ of the TP-HSMM define a trajectory in a model state j of respective sub-sequence of model states for the respective skill.

Afterwards a step 506 is executed.

In Step 506 the second model 128 is provided. The second model 128 comprises the plurality of sequences of model states.

Determining the second model 128 may comprise determining the transition probability $a_{k_f}$ from the final model state of the first sub-sequence according to the first skill to a plurality of initial model states of different second sub-sequences according to different instances of the second skill.

The final model state of the first sub-sequence may be determined depending on a final component $k_f \in \Theta_{a_1}$ of an instance of the first skill.

The at least one initial model state of the second sub-sequence may be determined depending on an initial component $k_i \in \Theta_{a_2}^{k_f}$ of an instance of the second skill.

The transition probability $a_{k_f}$ may be determined depending on a divergence between a first Gaussian Mixture Model for the final component $k_f$ and a second Gaussian Mixture Model for the initial component $k_i$ e.g. as described above based on the Kullback-Leiber divergence.

The instance of the first skill and/or the instance of the second skill may be defined by a respective TP-HSMM.

The method may comprise in a step 508 mapping a first observation $\xi_0$ for the machine 104 to the first system state $x_0$. The optimal sequence of states $\hat{s}*$ may start at the first system state $x_0$ matching the first observation G.

The method may comprise in a step 510 providing the second system state $x_G$. The second system state $x_G$ may be a mapping of a predetermined second observation $\xi_T$ to the second state $x_G$. The optimal sequence of states $\hat{s}*$ ends at the second system state $x_G$.

The first observation $\xi_0$ may characterize the machine 104 or the environment of the machine 104 before executing a first skill in the sequence a* of skills 132. The second observation $\xi_T$ may characterize the machine 104 or the environment of the machine 104 after executing a last skill in the sequence a* of skills 132.

Afterwards a step 512 is executed.

Step 512 comprises selecting the optimal sequence of states $\hat{s}*$ from the plurality of sequences of model states of the second model 128, depending on the likelihood for the respective sequence of model states.

The likelihood is determined depending on the transition probability as described above.

This means that the likelihood for at least one sequence of the plurality of sequences is determined.

The sequence of model states that is selected from the second model 128 has a higher likelihood compared to at least one other sequence of model states of the plurality of sequences of states.

Afterwards a step 514 is executed.

In Step 514, the parameters $(\hat{\mu}_j, \hat{\Sigma}_j)$ for a current model state j of the optimal sequence of states $\hat{s}*$ are determined.

The parameters $(\hat{\mu}_j, \hat{\Sigma}_j)$ may be determined as the parameters $(\hat{\mu}_j, \hat{\Sigma}_j)$ of the TP-HSMM defining the trajectory of the model state j of respective sub-sequence of states for the respective skill.

Afterwards a step 516 is executed.

Step 516 comprises determining a control signal $\hat{u}*$ for operating the machine 104 according to the trajectory depending on the parameter $(\hat{\mu}_j, \hat{\Sigma}_j)$. In the example, the optimal control solution is determined as described above recursively.

Afterwards, the step 514 is executed for a next state in the sequence of states until the final state j of the last skill in the sequence a* of skills is reached.

What is claimed is:

1. A method of operating a machine, the method comprising the following steps:
- providing a sequence of skills of the machine for executing a task;
- selecting a sequence of states from a plurality of sequences of states, depending on a likelihood, wherein the likelihood is determined depending on a transition probability from a final state of a first sub-sequence of states of the sequence of states for a first skill in the sequence of skills to an initial state of a second sub-sequence of states of the sequence of states for a second skill in the sequence of skills; and
- executing the task based on at least the first skill and the second skill, wherein the task includes physically manipulating an object by the machine, wherein the final state of the first sub-sequence is determined depending on a final component of an instance of the first skill, wherein the initial state of the second sub-sequence is determined depending on an initial component of an instance of the second skill, and wherein the transition probability is determined depending on a divergence between a first Gaussian mixture Model for the final component and a second Gaussian mixture Model for the initial component.

2. The method according to claim 1, further comprising:
providing a first model for the first skill, wherein a parameter of the first model defines a trajectory in a state of the first sub-sequence of states, or
providing a first model for the second skill, wherein a parameter of the first model defines a trajectory in a state of the second sub-sequence of states;
wherein the method further comprises determining for the state of the sequence of states, the parameter, and determining a control signal for operating the machine according to the trajectory depending on the parameter.

3. The method according to claim 1, further comprising:
providing a second model including the plurality of sequences of states;
determining the likelihood for at least one sequence of the plurality of sequences depending on the transition probabilities between the sub-sequences of states for the skills in the at least one sequence; and
selecting the sequence of states from the second model having a higher likelihood compared to at least one other sequence of states of the plurality of sequences of states.

4. The method according to claim 3, wherein the providing of the second model includes determining the transition probability from a final state of the first sub-sequence according to the first skill to a plurality of initial states of different second sub-sequences according to different instances of the second skill.

5. The method according to claim 4, wherein an instance of the first skill and/or an instance of the second skill is defined by a task-parameterized hidden semi Markov model.

6. The method according to claim 1, further comprising:
mapping a first observation for the machine to a first state, wherein the sequence of states starts at the first state, and/or mapping a second observation to a second state;
wherein the sequence of states ends at the second state.

7. The method according to claim 6, wherein:
the first observation characterizes the machine or an environment of the machine before executing a first skill in the sequence of skills, and/or
the second observation characterizes the machine or the environment of the machine after executing a last skill in the sequence of skills.

8. A device for operating a machine, the device configured to:
provide a sequence of skills of the machine for executing a task;
select a sequence of states from a plurality of sequences of states, depending on a likelihood, wherein the likelihood is determined depending on a transition probability from a final state of a first sub-sequence of states of the sequence of states for a first skill in the sequence of skills to an initial state of a second sub-sequence of states of the sequence of states for a second skill in the sequence of skills; and
execute the task based on at least on the first skill and the second skill, wherein the task includes physically manipulating an object by the machine, wherein the final state of the first sub-sequence is determined depending on a final component of an instance of the first skill, wherein the initial state of the second sub-sequence is determined depending on an initial component of an instance of the second skill, and wherein the transition probability is determined depending on a divergence between a first Gaussian mixture Model for the final component and a second Gaussian mixture Model for the initial component.

9. A non-transitory computer-readable medium on which is stored a computer program including computer readable instructions for operating a machine, the instructions, when executed by a computer, causing the computer to perform the following steps:
providing a sequence of skills of the machine for executing a task;
selecting a sequence of states from a plurality of sequences of states, depending on a likelihood, wherein the likelihood is determined depending on a transition probability from a final state of a first sub-sequence of states of the sequence of states for a first skill in the sequence of skills to an initial state of a second sub-sequence of states of the sequence of states for a second skill in the sequence of skills; and
executing the task based on at least on the first skill and the second skill, wherein the task includes physically manipulating an object by the machine, wherein the final state of the first sub-sequence is determined depending on a final component of an instance of the first skill, wherein the initial state of the second sub-sequence is determined depending on an initial component of an instance of the second skill, and wherein the transition probability is determined depending on a divergence between a first Gaussian mixture Model for the final component and a second Gaussian mixture Model for the initial component.

* * * * *